United States Patent
Yousef et al.

(10) Patent No.: US 7,729,463 B2
(45) Date of Patent: Jun. 1, 2010

(54) HOST PROCESSOR ASSISTED FAST RE-SYNCHRONIZATION TECHNIQUES FOR DVB-H SYSTEMS

(75) Inventors: Nabil R. Yousef, Foothill Ranch, CA (US); Jun Ma, Irvine, CA (US); Chaoliang T. Chen, Irvine, CA (US)

(73) Assignee: Newport Media, Inc., Lake Forest, CA (US)

( * ) Notice: Subject to any disclaimer, the term of this patent is extended or adjusted under 35 U.S.C. 154(b) by 773 days.

(21) Appl. No.: 11/615,292

(22) Filed: Dec. 22, 2006

(65) Prior Publication Data
US 2008/0151799 A1 Jun. 26, 2008

(51) Int. Cl.
*H04L 7/00* (2006.01)
(52) U.S. Cl. .................................... 375/357
(58) Field of Classification Search ................ 375/357, 375/362
See application file for complete search history.

(56) References Cited

U.S. PATENT DOCUMENTS

| | | | |
|---|---|---|---|
| 5,440,266 A | 8/1995 | Ono | |
| 5,625,768 A | 4/1997 | Dye | |
| 5,845,060 A | 12/1998 | Vrba et al. | |
| 5,845,215 A | 12/1998 | Henry et al. | |
| 5,948,105 A | 9/1999 | Skurnik et al. | |
| 6,101,608 A | 8/2000 | Schmidt et al. | |
| 6,507,592 B1 | 1/2003 | Hurvig et al. | |
| 6,538,656 B1 | 3/2003 | Cheung et al. | |
| 2002/0086707 A1 | 7/2002 | Struhsaker et al. | |
| 2004/0039504 A1 | 2/2004 | Coffee et al. | |
| 2006/0220901 A1 | 10/2006 | Ginggen et al. | |
| 2007/0019578 A1* | 1/2007 | Meiri | 370/311 |
| 2007/0177667 A1* | 8/2007 | Subramania et al. | 375/240.12 |

* cited by examiner

*Primary Examiner*—Don N Vo
(74) *Attorney, Agent, or Firm*—Rahman LLC

(57) ABSTRACT

A system and method of performing re-synchronization for a Digital Video Broadcasting over Handheld (DVB-H) receiver, wherein the method comprises performing a time division multiplexing (TDM) data burst transmission sequence on bits of data received by the DVB-H receiver; performing a data bit re-synchronization sequence on the DVB-H receiver; removing an on-chip timer and internal state registers in the DVB-H receiver; and allowing the DVB-H receiver to power off in between receipt of data bursts. Preferably, the removing process reduces the time to perform the re-synchronization in the DVB-H receiver. Preferably, the data bit re-synchronization sequence comprises performing an automatic gain control (AGC) lock process; performing a mode and guard detecting process; performing a frequency offset estimation process; performing a transmit parameter signaling (TPS) detection process; performing a timing and carrier loop lock process; and performing an equalizer delay process.

20 Claims, 3 Drawing Sheets

HOST PROCESSOR ASSISTED FAST RE-SYNCHRONIZATION TECHNIQUES FOR DVB-H SYSTEMS

CROSS-REFERENCE TO RELATED APPLICATIONS

This application is related to U.S. patent application entitled, "FAST RE-SYNCHRONIZATION TECHNIQUES FOR DVB-H SYSTEMS," Ma et al., U.S. Ser. No. 11/615,274 filed on Dec. 22, 2006, the complete disclosure of which, in its entirety, is herein incorporated by reference.

BACKGROUND

1. Technical Field

The embodiments herein generally relate to wireless technologies, and, more particularly, to mobile television (TV) technologies.

2. Description of the Related Art

In Digital Video Broadcasting over Handheld (DVB-H) device systems, a time division multiplexing (TDM) based scheme, so called time-slicing, is introduced to reduce the average power consumption in DVB-H receiver. The concept of time-slicing is to send data in bursts using a significantly higher bit rate compared to the bit rate required if the data was transmitted continuously. Within a burst, the time to the beginning of the next burst ($\Delta T$) is indicated. Between the bursts, the data of the elementary stream is not transmitted, allowing other elementary streams to use the bit rate otherwise allocated. This enables a receiver to stay active for only a fraction of the time, while receiving bursts of a request service.

The receiver can sleep for a period of time equal to $\Delta T$ before it wakes up again to receive the next burst. In order to wake up again after a period of time $\Delta T$, the receiver has to keep a timer running. This timer times out after $\Delta T$ and wakes up the receiver. This timer requires a clock running on-chip during the sleep time, $\Delta T$. This requires having a crystal oscillator (XO) and phase locked loop (PLL) circuits to be running on the chip, which consumes significant power.

Furthermore, before the arrival of the next burst, the receiver has to wake up a bit earlier to synchronize some PHY parameters; e.g., carrier and timing offset, transmit parameter signaling (TPS) information to determine the scattered pilots location for channel equalization, etc. The time required to re-synchronize these parameters determines how early the receiver has to wake up before the arrival of the next burst. The longer the re-synchronization time, the longer the receiver active time is during the burst reception and thus, the higher the average receiver power consumption. In order to reduce the average power consumption, it is essential to reduce the receiver re-synchronization time between bursts. To facilitate the re-synchronization process, an on-chip timer and several internal state registers have be needed to be active while the receiver is in the sleeping mode. This consumes additional power of running the XO, PLL circuits, and timer circuits between bursts. Accordingly, there remains a need for a re-synchronization technique that facilitates low power consumption in a DVB-H receiver.

SUMMARY

In view of the foregoing, an embodiment herein provides a method of performing re-synchronization for a DVB-H receiver, wherein the method comprises performing a TDM data burst transmission sequence on bits of data received by the DVB-H receiver; performing a data bit re-synchronization sequence on the DVB-H receiver; removing an on-chip timer and internal state registers in the DVB-H receiver; and allowing the DVB-H receiver to power off in between receipt of data bursts. Preferably, the removing process reduces the time to perform the re-synchronization in the DVB-H receiver. Preferably, the data bit re-synchronization sequence comprises performing an automatic gain control (AGC) lock process; performing a mode and guard detecting process; performing a frequency offset estimation process; performing a TPS detection process; performing a timing and carrier loop lock process; and performing an equalizer delay process.

Moreover, the method may further comprise using a processor from a host data transmission device to use a counter to count down a period of time after which the host processor turns on a demodulator in the DVB-H receiver. Additionally, the method may further comprise the host processor (a) reading a value of the period of time from the DVB-H receiver; (b) turning off the demodulator; (c) initiating a timer counting the period of time; and (d) turning on the demodulator after the period of time being counted on the timer expires. Also, the method may further comprise repeating steps (a) through (d) for every burst of data.

Additionally, the method may further comprise storing, in the host processor, a last value of an AGC control word when the DVB-H receiver enters into a sleep mode of operation, wherein the last value of the AGC control word is used to initialize a new AGC control word when the DVB-H receiver turns on from the sleep mode of operation. Furthermore, the method may further comprise storing, in the host processor, a detected mode and guard from an immediately preceding data burst when the DVB-H receiver enters into a sleep mode of operation; and utilizing the stored detected mode and guard when the DVB-H receiver turns on from the sleep mode of operation.

Moreover, the method may further comprise storing, in the host processor, an estimated coarse frequency offset from an immediately preceding data burst when the DVB-H receiver enters into a sleep node of operation; and utilizing the stored estimated coarse frequency offset to initialize a coarse frequency offset for an incoming data burst when the DVB-H receiver turns on from the sleep mode of operation. Also, the method may further comprise storing, in the host processor, internal states of timing and carrier frequency tracking loops from an immediately preceding data burst when the DVB-H receiver enters into a sleep node of operation; and utilizing the stored internal states of timing and carrier frequency tracking loops to initialize a coarse frequency offset for an incoming data burst when the DVB-H receiver turns on from the sleep mode of operation.

Furthermore, the method may further comprise using the host processor to correct an orthogonal frequency-division multiplexing (OFDM) symbol number, correct a frame number, and correct a Fast Fourier Transform (FFT) trigger point when the DVB-H receiver turns on from a sleep mode of operation.

Another embodiment provides a method of performing re-synchronization for a DVB-H receiver, wherein the method comprises performing a TDM data burst transmission sequence on bits of data received by the DVB-H receiver; performing a data bit re-synchronization sequence on the DVB-H receiver; removing an on-chip timer and internal state registers in the DVB-H receiver; and powering the DVB-H receiver off in between receipt of data bursts, wherein the method further comprises using a processor from a host data transmission device to use a counter to count down a period of time after which the host processor turns on a demodulator in the DVB-H receiver, wherein the method further comprises the host processor (a) reading a value of the period of time from the DVB-H receiver; (b) turning off the demodulator; (c) initiating a timer counting the period of time; and (d) turning on the demodulator after the period of time being counted on the timer expires, wherein the removing reduces the time to perform the re-synchronization in the DVB-H receiver, and wherein the method further comprises repeating steps (a) through (d) for every burst of data.

Preferably, the data bit re-synchronization sequence comprises performing an AGC lock process; performing a mode and guard detecting process; performing a frequency offset estimation process; performing a TPS detection process; performing a timing and carrier loop lock process; and performing an equalizer delay process. The method may further comprise storing, in the host processor, a last value of an AGC control word when the DVB-H receiver enters into a sleep mode of operation, wherein the last value of the AGC control word is used to initialize a new AGC control word when the DVB-H receiver turns on from the sleep mode of operation.

Additionally, the method may further comprise storing, in the host processor, a detected mode and guard from an immediately preceding data burst when the DVB-H receiver enters into a sleep mode of operation; and utilizing the stored detected mode and guard when the DVB-H receiver turns on from the sleep mode of operation. Also, the method may further comprise storing, in the host processor, an estimated coarse frequency offset from an immediately preceding data burst when the DVB-H receiver enters into a sleep node of operation; and utilizing the stored estimated coarse frequency offset to initialize a coarse frequency offset for an incoming data burst when the DVB-H receiver turns on from the sleep mode of operation.

Moreover, the method may further comprise storing, in the host processor, an internal states of timing and carrier frequency tracking loops from an immediately preceding data burst when the DVB-H receiver enters into a sleep mode of operation; and utilizing the stored internal states of timing and carrier frequency tracking loops to initialize a coarse frequency offset for an incoming data burst when the DVB-H receiver turns on from the sleep mode of operation. Furthermore, the method may further comprise using the host processor to correct an OFDM symbol number, correct a frame number, and correct a FFT trigger point when the DVB-H receiver turns on from a sleep mode of operation.

Another embodiment provides a system of performing re-synchronization for a DVB-H receiver, comprising an on-chip timer and internal state registers, wherein the system comprises a first logic unit adapted to perform a TDM data burst transmission sequence on bits of data received by the DVB-H receiver; a second logic unit adapted to perform a data bit re-synchronization sequence on the DVB-H receiver; means for removing the on-chip timer and internal state registers in the DVB-H receiver; and a cycle clock adapted to power the DVB-H receiver off in between receipt of data bursts, wherein the removing means reduces the time to perform the re-synchronization in the DVB-H receiver.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
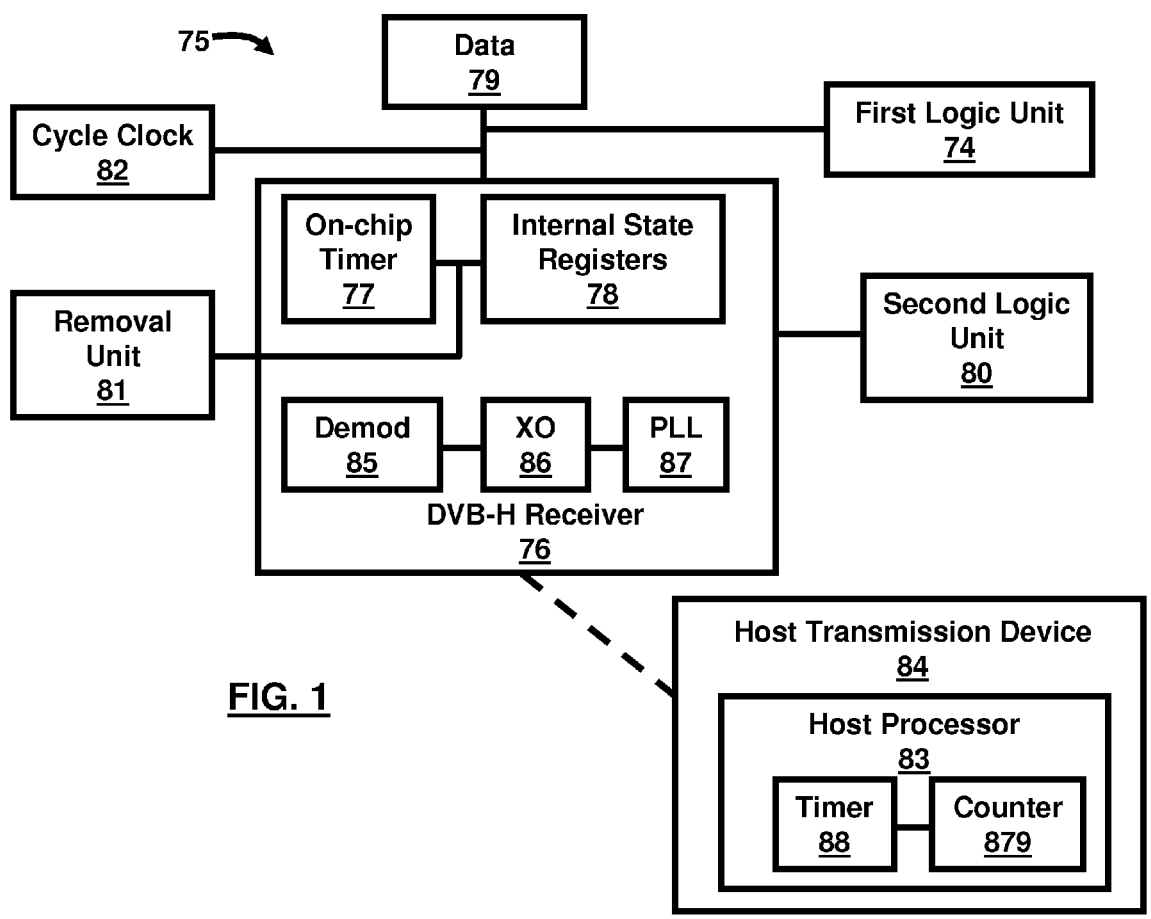
FIG. 1 is a flow diagram illustrating a preferred method according to an embodiment herein.
Figure 2:
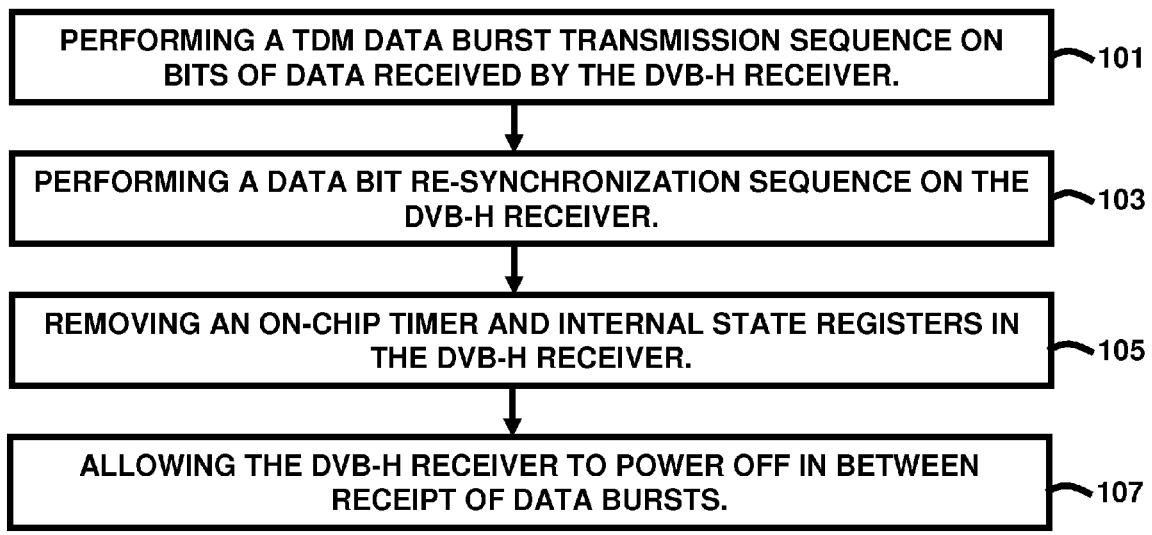
FIG. 2 illustrates a schematic diagram of a system according to an embodiment herein.
Figure 3:
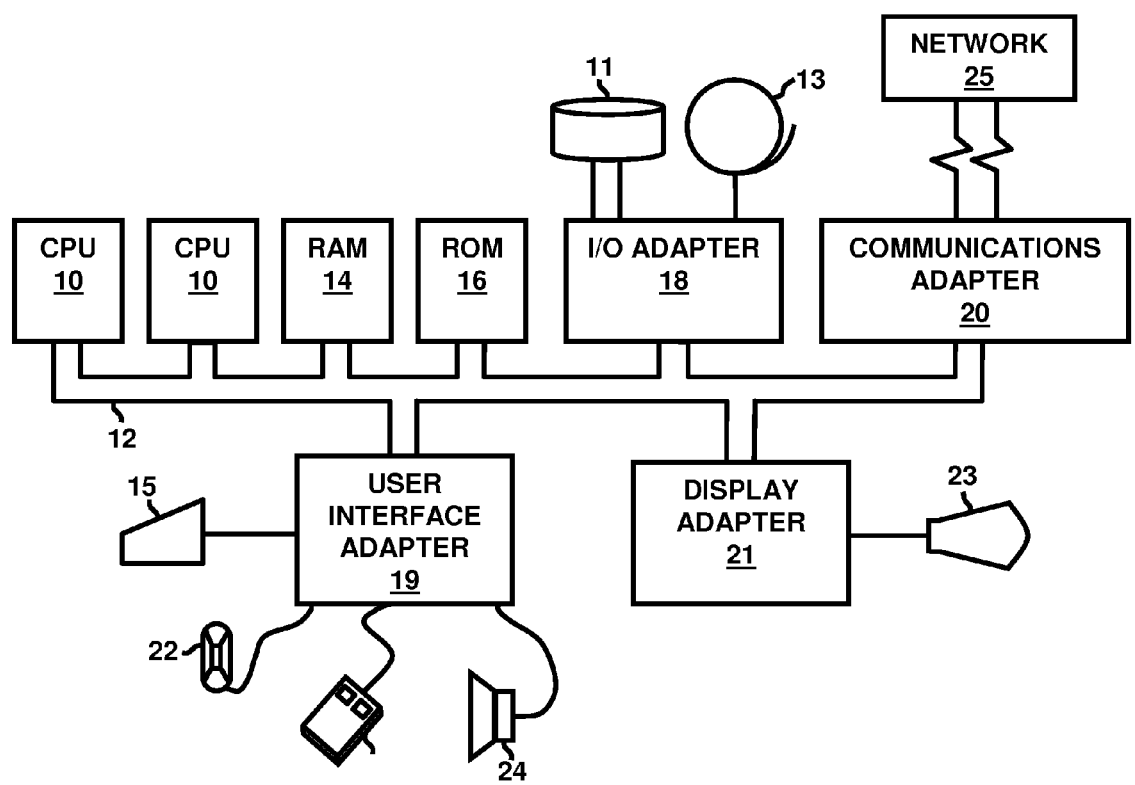
FIG. 3 illustrates a schematic diagram of a computer system according to an embodiment herein.

As mentioned, there remains a need for a re-synchronization technique that facilitates low power consumption in a DVB-H receiver. The embodiments herein achieve this by providing a host processor assisted technique that removes the active circuits (i.e., on-chip timers and internal state registers) while the DVB-H receiver is in a sleeping mode of operation and allows the complete power shut off of the DVB-H receiver between bursts in order to save power. In other words, after moving the on-chip timers and internal state registers to the host processor, the DVB-H receiver can be completely shut off. Referring now to the drawings, and more particularly to FIGS. 1 through 3, where similar reference characters denote corresponding features consistently throughout the figures, there are shown preferred embodiments.

In accordance with an embodiment herein, FIG. 1 illustrates a system 75 of performing re-synchronization for a DVB-H receiver 76, comprising an on-chip timer 77 and internal state registers 78, wherein the system 75 comprises a first logic unit 74 adapted to perform a TDM data burst transmission sequence on bits of data 79 received by the DVB-H receiver 76; a second logic unit 80 adapted to perform a data bit re-synchronization sequence on the DVB-H receiver 76; a removal unit 81 adapted to remove the on-chip timer 77 and internal state registers 78 in the DVB-H receiver 76; and a cycle clock 82 adapted to power the DVB-H receiver 76 off in between receipt of data bursts, wherein the removal unit 81 reduces the time to perform the re-synchronization in the DVB-H receiver 76.

The DVB-H receiver re-acquisition sequences include the stages of automatic gain control (AGC) lock, mode and guard detection, frequency offset estimation, TPS detection, timing and carrier frequency tracking loop lock, and equalizer delay. During the AGC locking stage, the analog-to-digital (A/D) output signal strength is measured and compared with a preset threshold. The error signal is used to drive a phase locked loop to adjust the analog variable gain controlled oscillator (not shown) before the A/D converter (not shown) so that the A/D input signal level is set at the correct level to fully utilize the A/D dynamic range. During the mode and guard detection stage, the transmission mode and guard information are detected using a time-domain correlation approach, and the fine-frequency offset information is also obtained at this stage. During the TPS detection stage, the TPS sync word is searched continuously until the TPS is locked and the TPS information is then decoded to program the necessary blocks of the receiver 76. During the timing and carrier frequency tracking stage, the timing and carrier frequency offset errors are detected and then used to drive a digital phase locked loop to adjust the timing and frequency offset. During the equalization stage, the channel state information is first estimated and then used to equalize the received the data information. In order to reduce the re-synchronization time at various stages of the re-acquisition sequences, internal state registers are used to store the various receiver internal states during the receiver sleeping period.

Some of these internal states include: (1) the last AGC control word when the receiver 76 enters into a sleep mode; (2) the mode and guard values detected from the immediately preceding data burst; (3) the coarse frequency offset estimated from the immediately preceding data burst; and (4) the internal states of the timing and carrier recovery tracking loops.

The above stored variables are used to initialize the DVB-H receiver 76 when it wakes up to reduce the re-synchronization time. In addition, an on-chip timer 77 is utilized to be active during the DVB-H receiver sleeping period to count: the correct symbol number, the correct frame number, and the correct FFT trigger point, when the DVB-H receiver 76 wakes up.

The utilization of the active on-chip timer 77 and internal state registers 78 generally requires the receiver XO 86 and PLL 87 to be active between data bursts, which draw the current and consumes power during the DVB-H receiver sleep mode of operation. Accordingly, the embodiments herein use the host processor 83 to handle these tasks thus enabling the DVB-H receiver 76 to be in a complete power off mode between data bursts in order to save power.

The host processor 83 can be used to assist a fast re-synchronization process in DVB-H systems by allowing the DVB-H receiver 76 to achieve complete power off in between data bursts to save power. The host processor 83 can be used to hold the ΔT timer 88. The timer 88 is implemented in the host processor 83 preferably using a software-based approach. Accordingly, the host transmission device 84 uses a counter 89 to count down a period of time ΔT after which it wakes up the demodulator 85. Moreover, the counter 89 is implemented in the host processor 83 preferably using a software based approach. In order to do so, the host processor 83 first reads the value of ΔT from the demodulator 85, turns the demodulator 85 off, initiates the ΔT timer 88, and wakes up the demodulator 85 again after the ΔT timer 88 expires. This process is repeated for every burst of data.

The last AGC control word when the receiver 76 enters into a sleep mode of operation can be stored in the host processor 83 and used to initialize the AGC control word when the DVB-H receiver 76 wakes up to reduce the AGC lock time. The detected mode and guard from the previous data burst can be stored in the host processor 83 and used to force the mode and guard when the DVB-H receiver 76 wakes up to reduce the mode and guard detection time. Preferably, the average input signal level does not change much from burst to burst, and the AGC setting in the previous burst should be a good indicator of the input signal level of the current burst. The estimated coarse frequency offset from the previous burst can be stored in the host processor 83 when the DVB-H receiver 76 enters into a sleep mode of operation and is used to initialize the coarse frequency offset for the next incoming burst when the DVB-H receiver 76 wakes up to reduce the frequency offset estimation time.

The coarse frequency offset does not change much from burst to burst. The estimated coarse frequency offset from the previous burst should be a good initial estimator for the one in the current burst. The internal states of the timing and carrier frequency tracking loops can be stored in the host processor 83 when the DVB-H receiver 76 enters into a sleep mode of operation and is used to initialize the timing and carrier frequency tracking loops when the DVB-H receiver 76 wakes up to reduce the loop convergence time. Here, the internal state of the timing and carrier frequency tracking loops of the previous burst are a good initial estimator of the internal state of the timing and carrier frequency tracking loops of the current burst. The timing and carrier frequency offset preferably does not drift too much from burst to burst. The host processor 83 can be used to count the correct symbol number, the correct frame number, and the correct FFT trigger point, when the DVB-H receiver 76 wakes up. More specifically, by counting the symbol number, the correct frame number, and the correct FFT trigger point through the implemented counter 89 and timer 88 in the host processor 83, the demodulator 85 does not need to wait for TPS lock to continue the data processing. Accordingly, this shortens the acquisition time significantly.

FIG. 2, with reference to FIG. 1, is a flow diagram illustrating a method of performing re-synchronization for a DVB-H receiver 76 according to an embodiment herein, wherein the method comprises performing (101) a TDM data burst transmission sequence on bits of data 79 received by the DVB-H receiver 76; performing (103) a data bit re-synchronization sequence on the DVB-H receiver 76; removing (105) an on-chip timer 77 and internal state registers 78 in the DVB-H receiver 76; and allowing (107) the DVB-H receiver 76 to power off in between receipt of data bursts. Preferably, the removing process (105) reduces the time to perform the re-synchronization in the DVB-H receiver 76. Preferably, the data bit re-synchronization sequence comprises performing an AGC lock process; performing a mode and guard detecting process; performing a frequency offset estimation process; performing a TPS detection process; performing a timing and carrier loop lock process; and performing an equalizer delay process.

Moreover, the method may further comprise using a processor 83 from a host data transmission device 84 to use a counter to count down a period of time after which the host processor 83 turns on a demodulator 85 in the DVB-H receiver 76. Additionally, the method may further comprise the host processor 83 (a) reading a value of the period of time from the DVB-H receiver 76; (b) turning off the demodulator 85; (c) initiating a timer counting the period of time; and (d) turning on the demodulator 85 after the period of time being counted on the timer expires. Also, the method may further comprise repeating steps (a) through (d) for every burst of data.

Additionally, the method may further comprise storing, in the host processor 83, a last value of an AGC control word when the DVB-H receiver 76 enters into a sleep mode of operation, wherein the last value of the AGC control word is used to initialize a new AGC control word when the DVB-H receiver 76 turns on from the sleep mode of operation. Furthermore, the method may further comprise storing, in the host processor 83, a detected mode and guard from an immediately preceding data burst when the DVB-H receiver 76 enters into a sleep mode of operation; and utilizing the stored detected mode and guard when the DVB-H receiver 76 turns on from the sleep mode of operation.

Moreover, the method may further comprise storing, in the host processor 83, an estimated coarse frequency offset from an immediately preceding data burst when the DVB-H receiver 76 enters into a sleep node of operation; and utilizing the stored estimated coarse frequency offset to initialize a coarse frequency offset for an incoming data burst when the DVB-H receiver 76 turns on from the sleep mode of operation. Also, the method may further comprise storing, in the host processor 83, internal states of timing and carrier frequency tracking loops from an immediately preceding data burst when the DVB-H receiver 76 enters into a sleep node of operation; and utilizing the stored internal states of timing and carrier frequency tracking loops to initialize a coarse frequency offset for an incoming data burst when the DVB-H receiver 76 turns on from the sleep mode of operation. Furthermore, the method may further comprise using the host processor 83 to correct an OFDM symbol number, correct a frame number, and correct a FFT trigger point when the DVB-H receiver 76 turns on from a sleep mode of operation.

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The embodiments herein can take the form of both hardware and software elements. The embodiments that are implemented in software may include, but is not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 3. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of performing re-synchronization for a Digital Video Broadcasting over Handheld (DVB-H) receiver, said method comprising:

performing a time division multiplexing (TDM) data burst transmission sequence on bits of data received by said DVB-H receiver;

performing a data bit re-synchronization sequence on said DVB-H receiver, wherein said data bit re-synchronization sequence comprises synchronization of said DVB-H receiver after wake up for receiving a next sequence of a data burst;

removing an on-chip timer and internal state registers in said DVB-H receiver; and allowing said DVB-H receiver to power off in between receipt of data bursts.

2. The method of claim 1, wherein said data bit re-synchronization sequence comprises:

performing an automatic gain control (AGC) lock process comprising measuring and comparing A/D output signal strength with a pre-set threshold;

performing a mode and guard detecting process comprising detecting transmission mode and guard information;

performing a frequency offset estimation process comprising obtaining fine-frequency offset information;

performing a transit parameter signaling (TPS) detection process comprising decoding TPS information to program blocks of said DVB-H receiver;

performing a timing and carrier loop lock process comprising adjusting timing and frequency offsets based on a digital phased lock loop; and performing an equalizer delay process comprising estimating and equalizing channel state information.

3. The method of claim 1, further comprising using a processor communicatively linked with said DVB-H receiver from a host data transmission device to use a counter to count down a period of time after which the host processor turns on a demodulator in said DVB-H receiver.

4. The method of claim 3, further comprising said host processor:

(a) reading a value of said period of time from said DVB-H receiver;

(b) turning off said demodulator;

(c) initiating a timer counting said period of time; and (d) turning on said demodulator after said period of time being counted on said timer expires.

5. The method of claim 4, further comprising repeating steps (a) through (d) for every burst of data.

6. The method of claim 2, further comprising storing, in said host processor, a last value of an AGC control word when said DVB-H receiver enters into a sleep mode of operation, wherein said last value of said AGC control word is used to initialize a new AGC control word when said DVB-H receiver turns on from said sleep mode of operation.

7. The method of claim 2, further comprising:

storing, in said host processor, a detected mode and guard from an immediately preceding data burst when said DVB-H receiver enters into a sleep mode of operation; and utilizing the stored detected mode and guard when said DVB-H receiver turns on from said sleep mode of operation.

8. The method of claim 1, further comprising:

storing, in said host processor, an estimated coarse frequency offset from an immediately preceding data burst when said DVB-H receiver enters into a sleep node of operation; and utilizing the stored estimated coarse frequency offset to initialize a coarse frequency offset for an incoming data burst when said DVB-H receiver turns on from said sleep mode of operation.

9. The method of claim 1, further comprising:

storing, in said host processor, internal states of timing and carrier frequency tracking loops from an immediately preceding data burst when said DVB-H receiver enters into a sleep node of operation; and utilizing the stored internal states of timing and carrier frequency tracking loops to initialize a coarse frequency offset for an incoming data burst when said DVB-H receiver turns on from said sleep mode of operation.

10. The method of claim 1, further comprising using said host processor to correct an orthogonal frequency-division multiplexing (OFDM) symbol number, correct a frame number, and correct a Fast Fourier Transform (FFT) trigger point when said DVB-H receiver turns on from a sleep mode of operation.

11. The method of claim 1, wherein the removing process reduces the time to perform said re-synchronization in said DVB-H receiver.

12. A method of performing re-synchronization for a Digital Video Broadcasting over Handheld (DVB-H) receiver, said method comprising:

performing a time division multiplexing (TDM) data burst transmission sequence on bits of data received by said DVB-H receiver;

performing a data bit re-synchronization sequence on said DVB-H receiver, wherein said data bit re-synchronization sequence comprises synchronization of said DVB-H receiver after wake up for receiving a next sequence of a data burst;

removing an on-chip timer and internal state registers in said DVB-H receiver; and powering said DVB-H receiver off in between receipt of data bursts, wherein said method further comprises using a processor from a host data transmission device to use a counter to count down a period of time after which the host processor turns on a demodulator in said DVB-H receiver, wherein said method further comprises said host processor:

(a) reading a value of said period of time from said DVB-H receiver;

(b) turning off said demodulator;

(c) initiating a timer counting said period of time; and (d) turning on said demodulator after said period of time being counted on said timer expires, wherein the removing reduces the time to perform said re-synchronization in said DVB-H receiver.

13. The method of claim 12, wherein said data bit re-synchronization sequence comprises:

performing an automatic gain control (AGC) lock process comprising measuring and comparing A/D output signal strength with a pre-set threshold;

performing a mode and guard detecting process comprising detecting transmission mode and guard information;

performing a frequency offset estimation process comprising obtaining fine-frequency offset information;

performing a transit parameter signaling (TPS) detection process comprising decoding TPS information to program blocks of said DVB-H receiver;

performing a timing and carrier loop lock process comprising adjusting timing and frequency offsets based on a digital phased lock loop; and performing an equalizer delay process comprising estimating and equalizing channel state information.

14. The method of claim 12, wherein said method further comprises repeating steps (a) through (d) for every burst of data.

15. The method of claim 13, wherein said method further comprises storing, in said host processor, a last value of an AGC control word when said DVB-H receiver enters into a sleep mode of operation, wherein said last value of said AGC control word is used to initialize a new AGC control word when said DVB-H receiver turns on from said sleep mode of operation.

16. The method of claim 13, wherein said method further comprises:
storing, in said host processor, a detected mode and guard from an immediately preceding data burst when said DVB-H receiver enters into a sleep mode of operation; and
utilizing the stored detected mode and guard when said DVB-H receiver turns on from said sleep mode of operation.

17. The method of claim 12, wherein said method further comprises:
storing, in said host processor, an estimated coarse frequency offset from an immediately preceding data burst when said DVB-H receiver enters into a sleep node of operation; and
utilizing the stored estimated coarse frequency offset to initialize a coarse frequency offset for an incoming data burst when said DVB-H receiver turns on from said sleep mode of operation.

18. The method of claim 12, wherein said method further comprises:
storing, in said host processor, an internal states of timing and carrier frequency tracking loops from an immediately preceding data burst when said DVB-H receiver enters into a sleep mode of operation; and
utilizing the stored internal states of timing and carrier frequency tracking loops to initialize a coarse frequency offset for an incoming data burst when said DVB-H receiver turns on from said sleep mode of operation.

19. The method of claim 12, wherein said method further comprises using said host processor to correct an orthogonal frequency-division multiplexing (OFDM) symbol number, correct a frame number, and correct a Fast Fourier Transform (FFT) trigger point when said DVB-H receiver turns on from a sleep mode of operation.

20. A system of performing re-synchronization for a Digital Video Broadcasting over Handheld (DVB-H) receiver, comprising an on-chip timer and internal state registers, said system comprising:
a first logic unit that performs a time division multiplexing (TDM) data burst transmission sequence on bits of data received by said DVB-H receiver;
a second logic unit that performs a data bit re-synchronization sequence on said DVB-H receiver, wherein said data bit re-synchronization sequence comprises synchronization of said DVB-H receiver after wake up for receiving a next sequence of a data burst, and wherein said data bit re-synchronization sequence comprises:
performing an automatic gain control (AGC) lock process comprising measuring and comparing A/D output signal strength with a pre-set threshold;
performing a mode and guard detecting process comprising detecting transmission mode and guard information;
performing a frequency offset estimation process comprising obtaining fine- frequency offset information;
performing a transit parameter signaling (TPS) detection process comprising decoding TPS information to program blocks of said DVB-H receiver;
performing a timing and carrier loop lock process comprising adjusting timing and frequency offsets based on a digital phased lock loop; and
performing an equalizer delay process comprising estimating and equalizing channel state information;
a host processor communicatively linked with said DVB-H receiver from a host data transmission device to use a counter to count down a period of time after which said host processor turns on a demodulator in said DVB-H receiver;
means for removing said on-chip timer and internal state registers in said DVB-H receiver; and
a cycle clock that powers said DVB-H receiver off in between receipt of data bursts,
wherein the removing means reduces the time to perform said re-synchronization in said DVB-H receiver,
wherein said host processor:
reads a value of said period of time from said DVB-H receiver;
turns off said demodulator;
initiates a timer counting said period of time;
turns on said demodulator after said period of time being counted on said timer expires;
stores a last value of an AGC control word when said DVB-H receiver enters into a sleep mode of operation, wherein said last value of said AGC control word is used to initialize a new AGC control word when said DVB-H receiver turns on from said sleep mode of operation;
stores a detected mode and guard from an immediately preceding data burst when said DVB-H receiver enters into a sleep mode of operation, wherein the stored detected mode and guard is used when said DVB-H receiver turns on from said sleep mode of operation;
stores an estimated coarse frequency offset from an immediately preceding data burst when said DVB-H receiver enters into a sleep node of operation, wherein the stored estimated coarse frequency offset initializes a coarse frequency offset for an incoming data burst when said DVB-H receiver turns on from said sleep mode of operation;
stores internal states of timing and carrier frequency tracking loops from an immediately preceding data burst when said DVB-H receiver enters into a sleep node of operation, wherein the stored internal states of timing and carrier frequency tracking loops initialize a coarse frequency offset for an incoming data burst when said DVB-H receiver turns on from said sleep mode of operation; and
corrects an orthogonal frequency-division multiplexing (OFDM) symbol number, correct a frame number, and correct a Fast Fourier Transform (FFT) trigger point when said DVB-H receiver turns on from a sleep mode of operation.

* * * * *